United States Patent [19]

Doyle

[11] Patent Number: 5,395,058
[45] Date of Patent: Mar. 7, 1995

[54] CONDITIONING FERTILIZER HOPPER

[75] Inventor: Monty M. Doyle, Quincy, Ill.

[73] Assignee: Doyle Equipment Manufacturing Company, Quincy, Ill.

[21] Appl. No.: 178,406

[22] Filed: Jan. 6, 1994

[51] Int. Cl.6 .............................................. B02C 7/11
[52] U.S. Cl. ................................. 241/73; 241/81;260.1
[58] Field of Search ............. 241/73, 81, 186.2, 260.1

[56] References Cited

U.S. PATENT DOCUMENTS

| | | | |
|---|---|---|---|
| 2,509,242 | 5/1950 | Miller et al. | 241/73 X |
| 2,889,119 | 6/1959 | Andreas | 241/73 X |
| 3,064,908 | 11/1962 | Hjelte | 241/81 X |
| 3,788,566 | 1/1974 | Morris, Jr. | 241/73 |
| 3,865,319 | 2/1975 | Hoffman | 241/260.1 X |
| 3,934,826 | 1/1976 | Graveman | 241/81 |
| 4,685,628 | 8/1987 | Berrett | 241/260.1 X |
| 4,938,426 | 7/1990 | Koenig | 241/260.1 X |

FOREIGN PATENT DOCUMENTS 841678 6/1952 Germany ........................ 241/81

Primary Examiner—Timothy V. Eley
Attorney, Agent, or Firm—Kalish & Gilster

[57] ABSTRACT

An agricultural hopper has conditioning structure therein including a mechanical agitator movably mounted within the hopper, and adapted for permitting flow-through of material which is of sufficiently small size to completely bypass the mechanical agitator and thereby greatly facilitate the rate of material flow-through.

10 Claims, 4 Drawing Sheets 5,395,058

CONDITIONING FERTILIZER HOPPER

BACKGROUND AND SUMMARY OF THE INVENTION

The present invention relates generally to the field of agricultural fertilizer hoppers, and, more specifically, to a new hopper which may be of the free-standing type or supported on some other equipment, and which includes structure for "conditioning" the fertilizer ingredients to enhance blending, packaging and use.

Typically, agricultural fertilizers consist of a combination of different ingredients, such as lime, nitrates and various fillers, for example, which ingredients are often in powdered or granular form. At the manufacturing facility various ratios of the different ingredients are mixed prior to shipping, often in quantities ranging up to tons. Ultimately, the fertilizer is made available to the consumer either in truck loads, or optionally in packages of, for example, one hundred pounds. The particular blend of ingredients will of course vary with the intended use and will be affected by such variables as the type of crop for which it will be applied, the soil conditions of the general geographic area, and the specific field upon which it will be introduced.

In preparation of the particular fertilizer chemical ratio, it is common practice for the manufacturer to prepare large batches by mixing known quantities of the substances in a rolling drum-type blender or a vertical blender and then transferring the mixed fertilizer via an elevator-type conveyor to a truck or other large containment device for transport directly to the field or to a retail or other facility.

To control and measure the specific quantities of ingredients being mixed, the different ingredients are placed into a bin, often provided with a scale for determining the weights of the ingredients being added to the mixture. Alternatively, ingredients may be measured by volume.

A well known problem in such operations is the tendency of fertilizer chemical ingredients to clump and clog machinery, which results in increased blend time, increased man-power to free the machinery and control mixing, and thus increased costs. This is especially known to happen when bulk quantities of fertilizer or individual fertilizer ingredients are stored from one season to the next. During the storage time the substances tend to accumulate moisture and to form agglomerates which cause clumping. The problem of ingredient clumping may even cause the end product to have an unintended ratio of ingredients, resulting in altered product effectiveness.

Thus, it is desirable to "condition" the various chemicals and other ingredients of the fertilizer in order to break up the clumps and more or less homogenize the physical character of each particular ingredient so that it may be more thoroughly and accurately blended with each of the other pre-treated (conditioned) substances.

Accordingly, in an attempt to address the above concerns, it is an object of the present invention to provide an agricultural fertilizer hopper which conditions substances prior to their introduction as fertilizer ingredients into a mixing device.

It is further among the several objects of the invention having the features indicated to provide a conditioning fertilizer hopper which is of relatively uncomplicated structure and thus which is facile and economical to manufacture as well as being suitable for adaptation into different convenient embodiments.

It is also among the objects of the present invention having the above features to provide a fertilizer hopper which can be used by an operator with little or no additional training beyond any which is already required for fertilizer blending operations.

Accordingly, in furtherance of the above objects, the present invention is, briefly, an agricultural hopper having conditioning structure therein including a mechanical agitator movably mounted within the hopper, and structure for permitting flow-through of material which is of sufficiently small size within the hopper to completely bypass the mechanical agitation means, to thereby greatly facilitate the rate of flow-through.

The present invention is also, briefly, a hopper which conditions material placed therein prior to transfer of the material to a mixer, the hopper includes a bin into which material to be conditioned is placed. The bin has downwardly sloping walls with lower edges and upper edges and which extend continuously therebetween. The walls terminate at the lower edges thereof slightly apart so as to define an opening for material exit at the bottom of the bin. The hopper includes structure for supporting the bin spacedly above a support surface therefor and for churning material to be conditioned which is placed in the bin. The structure for churning is movably mounted within the bin spacedly above the opening for material exit. The hopper also includes conditioning structure mounted within the bin spacedly in relation to the churning structure so as to cause conditioning of material placed into the bin at least before such material comes into contact with the churning structure, whereby the material placed into the hopper is conditioned prior to transfer to a mixer where it is mixed with other materials to enhance homogeneity of the resulting mixture.

The new hopper also has briefly, structure for conditioning material placed into the hopper, including a rigid trough penetrated by a plurality of apertures and mounted within the bin longitudinally adjacent to and beneath the auger so that as the auger rotates and churns material within the bin large chunks of material are forced against the trough, to thereby grind and crush the chunks of material into particles sufficiently small to pass through the apertures in the trough, after which the small particles of material exit through the hopper opening.

BRIEF DESCRIPTION OF THE DRAWINGS

Throughout the drawings like element numbers indicate like parts.

DESCRIPTION OF PRACTICAL EMBODIMENTS

Figure 1:
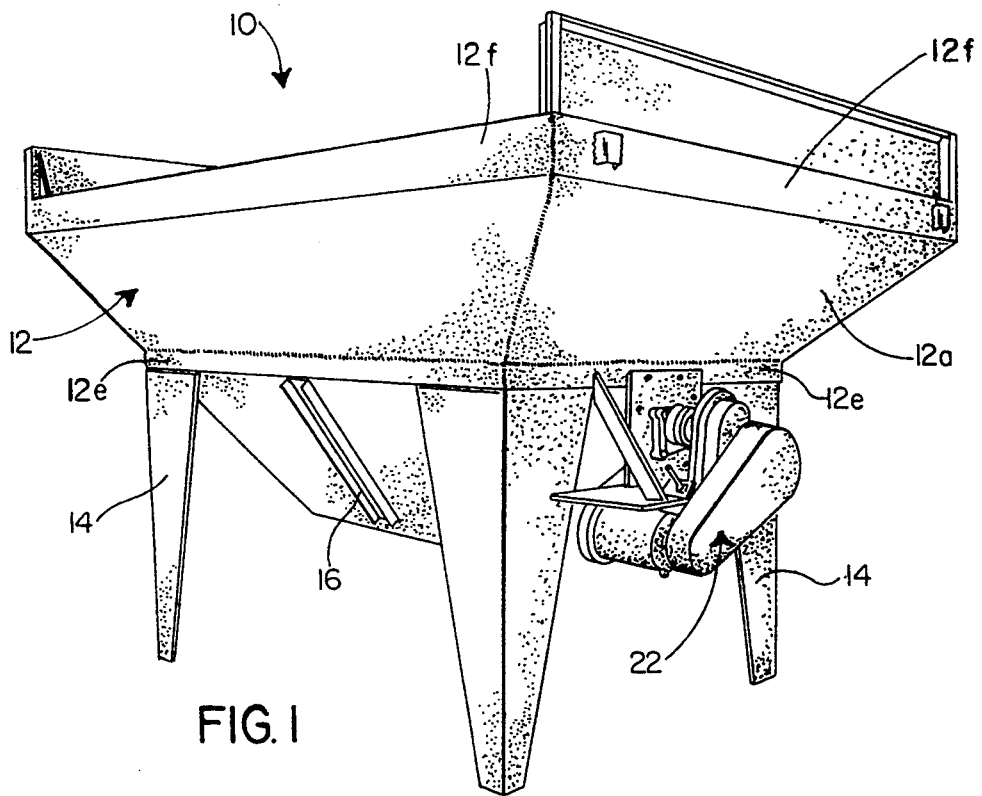
FIG. 1 is a perspective view of one type of fertilizer hopper having a conditioner and constructed in accordance with the invention.

With reference to the drawings, and specifically with reference to FIGS. 1–7, 10 generally designates a first embodiment of a fertilizer hopper constructed in accordance with and embodying the present invention. Hopper 10 includes a bin 12 usually having the general shape of an inverted truncated pyramid supported by four legs 14 spaced apart and connected to bin 12 in the usual fashion, as shown in FIGS. 1 and 4 through 6. For strength and durability bin 12 is preferably formed of stainless steel, but may be formed of carbon steel and may be provided with a plain finish, or may be painted, as desired.

For convenience of discussion hopper 10 has been shown with a rectangular plan view. It will be understood however that it could just as well be exactly square or some other shape. Similarly, hopper 10 could also have a more vertical configuration, rather than the generally horizontal bin shown, or have other known overall forms. For example, hopper 10 could be carried on a truck bed or be attached to a blend structure as later described with regard to FIGS. 8 and 9. Nonetheless, the critical features described and claimed hereafter can be slightly modified if necessary and still function as desired.

In the embodiment illustrated in FIGS. 1–7, bin 12 has two downwardly and inwardly sloping side walls 12a, 12b which face one another in spaced-apart fashion, each having substantially smooth, uninterrupted interior surfaces. The exterior surfaces of side walls 12a, 12b can be reinforced by a flange 12e which surrounds the entire exterior of bin 12 and provides a site for securing legs 14, or may also be smooth and substantially uninterrupted.

Bin 12 also has two downwardly and inwardly sloping end walls 12c, 12d, which also have smooth interior surfaces to facilitate downward sliding flow of material placed into hopper 10. The exterior surfaces of end walls 12c, 12d are similar in construction to side walls 12a, 12b. Optionally, the exterior of bin 12 may be reinforced on any of the walls, for example by addition of a reinforcement bar, such as that shown at 16 in FIG. 1, formed of channel iron or by other typical reinforcement methods. Preferably, a short, vertical edge 12f extends upwardly from each side and end wall, entirely around the top of bin 12. Edge 12f also provides structural reinforcement to bin 12, and may serve other uses as well.

As is often the case in agricultural hoppers, a screw auger 18 is rotatably mounted at the bottom of bin 12 to mechanically agitate and enhance movement within and removal of material from the hopper. Auger 18 has a shaft 20 rotatably mounted at its opposed ends in known fashion to bin end walls 12a, 12b and is operated by motor 22 in the usual manner. Auger blades 24 are fixed on shaft 20 so that as shaft 20 rotates they cause material in bin 12 to be churned and to generally flow toward rigid paddle 26 which is fixed at the center of shaft 20.

Paddle 26 facilitates breakage of large lumps of material and encourages any material at the bottom center of bin 12 to exit through an opening, indicated generally at 28, at the bottom center of the bin, at the lowermost juncture of the side and end walls. Material which exits bin 12 through opening 28 will ordinarily drop to an elevator and thus be transported to a mixer for further mixing of the various fertilizer ingredients.

Figure 2:
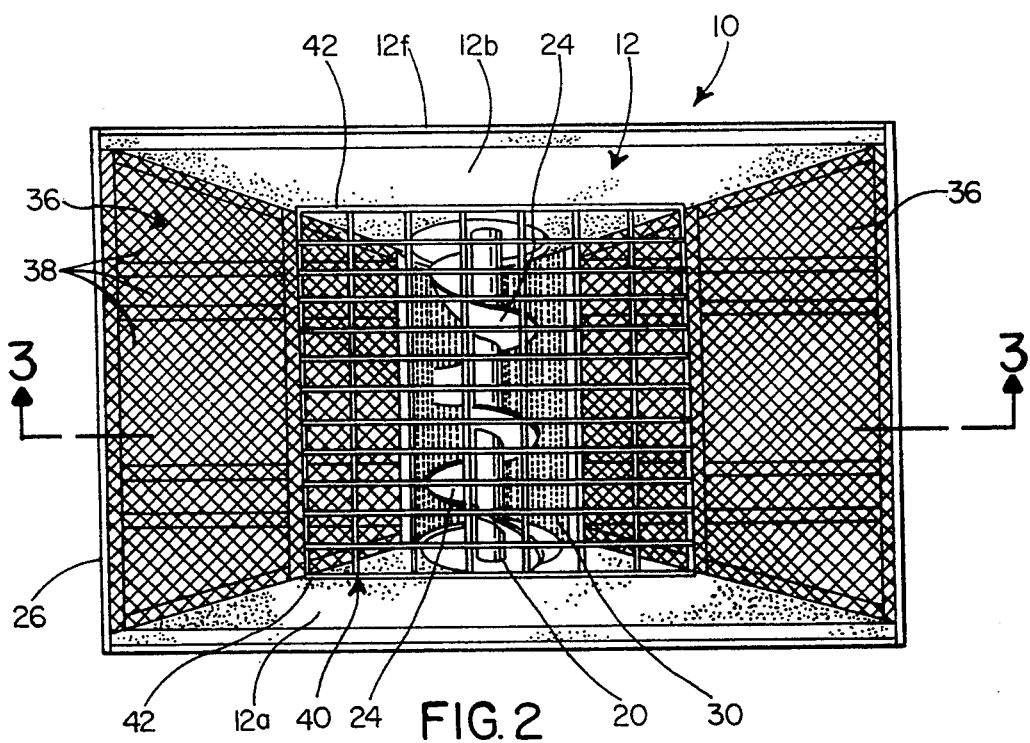
FIG. 2 is a top plan view of the hopper of FIG. 1 showing the fertilizer conditioner therein.
Figure 3:
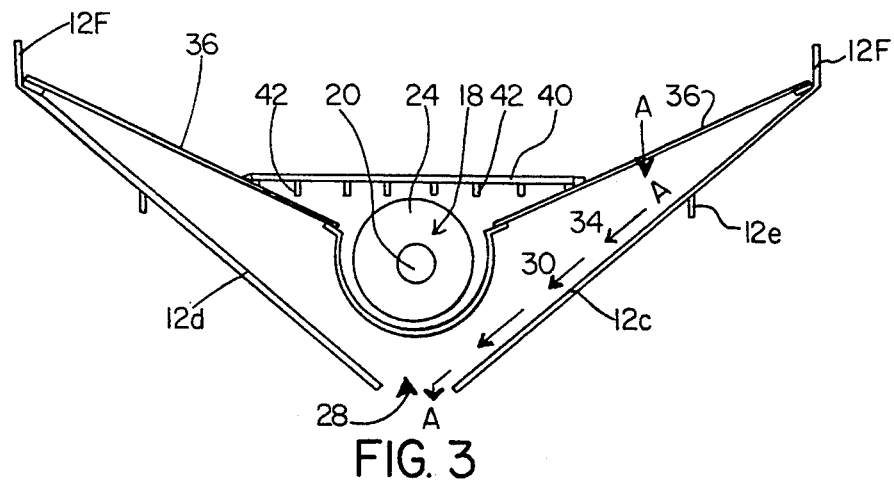
FIG. 3 is a sectional view of the fertilizer conditioner taken on line 3—3 in FIG. 2, with portions of the hopper removed for clarity.
Figure 4:
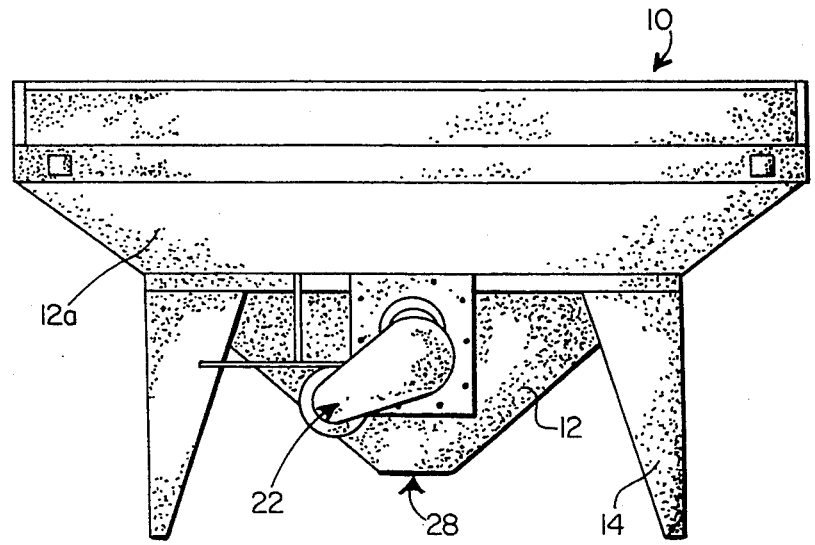
FIG. 4 is a side elevational view of the hopper of FIG. 1.
Figure 5:
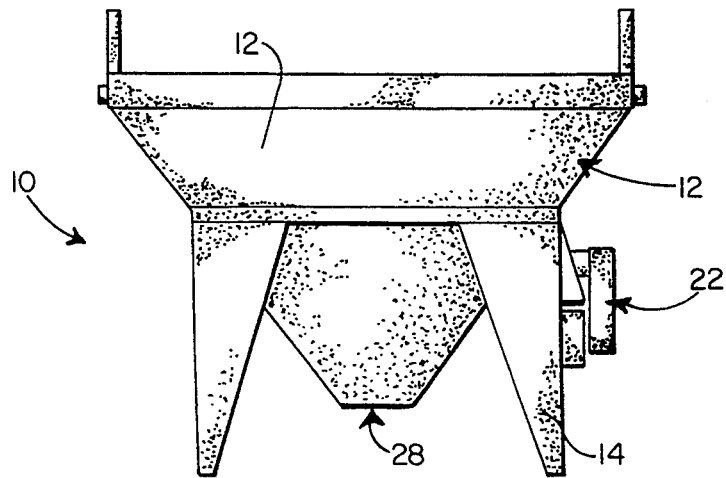
FIG. 5 is an end elevational view of the hopper of FIG. 1.
Figure 6:
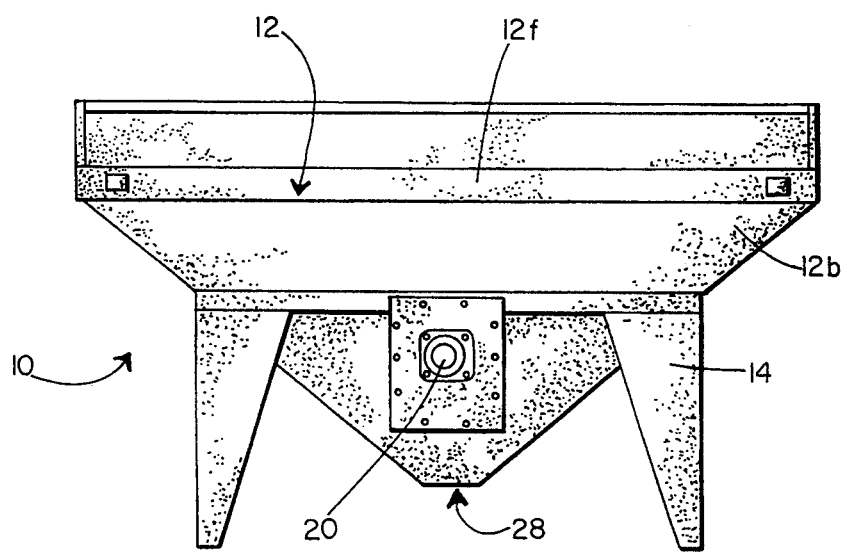
FIG. 6 is a side elevational view of the hopper of FIG. 1, showing the side opposite that shown in FIG. 4.
Figure 7:
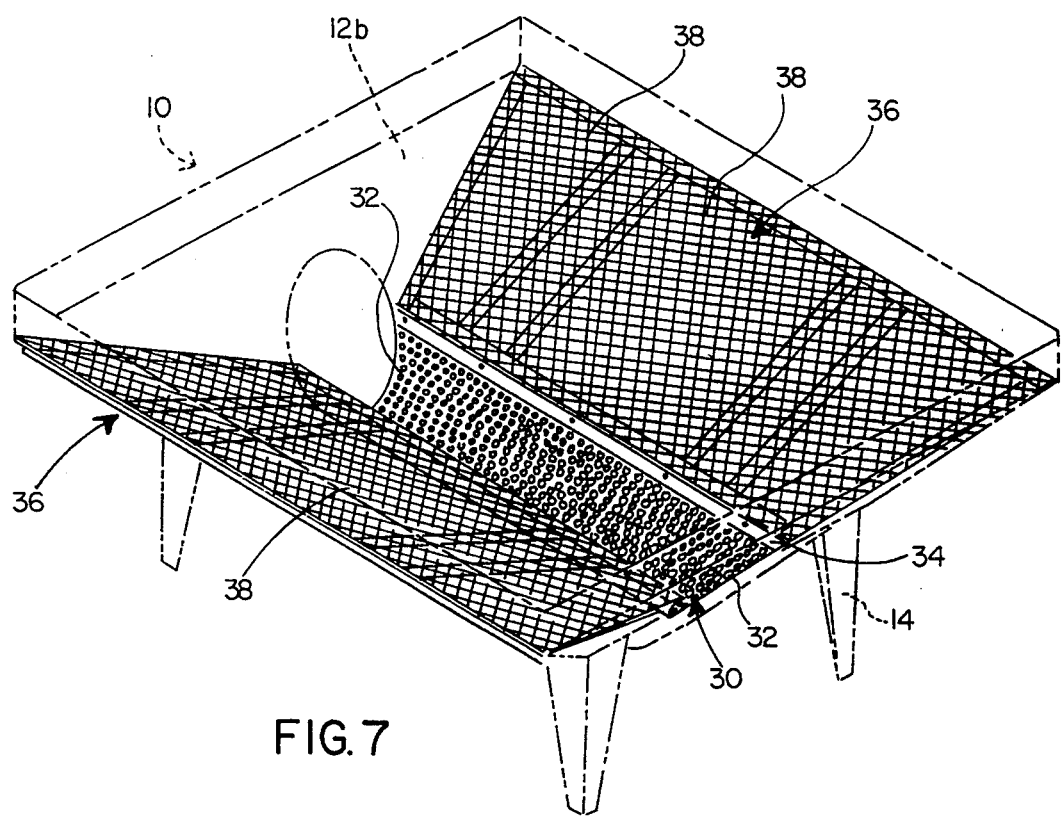
FIG. 7 is a perspective view of the conditioner of FIG. 2, with the hopper shown in phantom and the auger and horizontal grid removed for clarity of illustration.

A new structure is attached within bin 12 to permit conditioning of fertilizer ingredients placed into the open top thereof. This structure is seen in FIGS. 2, 3 and 7 to consist basically of a combination of screening devices sized to fit appropriately in the particular associated hopper, and which, when used in conjunction with the auger-containing hopper, such as just described, serve to very effectively condition the ingredients so as to permit much more thorough and homogenous mixing than is otherwise possible.

Directly beneath and mounted longitudinally and contiguously in relation to auger 18 is an elongated auger plate 30 which is fixed at each of its two ends to an adjacent, corresponding bin end wall 12a, 12b. Auger plate 30 is curved along its longitudinal axis so as to have a semicircular cross-section and to effectively form a trough in which auger 18 rotates in close proximity thereto, as seen in cross-section in FIG. 3. Preferably auger plate 30 is formed of steel so as to withstand a great deal of wear and extensive contact with material which may be somewhat moist and which may have hard pieces therein.

In this preferred embodiment auger trough or plate 30 is provided substantially across its entire surface with a multitude of small apertures 32, preferably of $\frac{1}{2}$ inch diameter and spaced $\frac{5}{8}$ inch apart. An unbroken longitudinal edge 34 is formed along each side of curved auger plate 30 so as to provide a site for fixing plate 30 to other structures.

Adjacent to each longitudinal unbroken edge 34 of auger plate 30 and fixed thereto, for example, by bolting, is a side screen 36. Preferably side screens 36 are formed of $\frac{1}{2}$ inch expanded metal (but may be $\frac{3}{8}$ inch, $\frac{3}{4}$ inch, 1 inch or $1\frac{1}{2}$ inch) in either stainless steel or painted carbon steel. Screens 36 extend in a plane from the longitudinal edges of auger trough or plate 30 at an angle across and above the entire corresponding bin side 12c, 12d and are fixed at their straight upper edges at the inner base of upper bin edge 12f.

As shown in the figures, side screens 36 define openings across their complete areas, which openings 38 are approximately the same size as or somewhat larger than openings 32 defined in auger plate 30.

FIGS. 2 and 3 illustrate a heavy metal grid 40 which is stably disposed or mounted approximately horizontally within bin 12 above auger 18. Grid 40 is constructed of flat metal bars 42 which are welded together so that when the grid is in the position described a narrow edge of each bar 42 is facing directly upwardly. In other words, the wider, flat edge of the bars is positioned vertically. Grid 40 is provided primarily for safety, but also provides another function to be described later.

It is also preferred that if the ends of the flat bars 42 forming the grid extend beyond the closest intersecting bar that they be cut at an upwardly and outwardly directed angle to such a degree as to more or less match the angle of the side screen 36 or the inside of bin side walls 12a, 12b upon which the outer ends of grid bars 42 rest. Grid 40 is of course rectangular or square and made to such dimensions as are necessary so that the grid spans the entire internal area of bin 12 in a substantially horizontal plane just above auger 18.

So constructed, the conditioning structure provides the following advantageous functions: Side screens 36 permit fines to filter or sift immediately through to the inside of end walls 12c, 12d where they flow immediately downwardly to hopper opening 28, bypassing auger 18 and the material volume churned thereby, along a path illustrated in FIG. 3 and indicated by arrows A. This greatly increases the speed at which a given volume of material passes through hopper 10 by allowing some material to completely bypass auger 18 if the churning and crushing action of the auger is not needed. Such reduction in volume going through the auger of course greatly improves the speed at which a batch of fertilizer ingredients can be conditioned for further processing.

Extremely large chunks of material which have agglomerated will effectively be sliced into small blocks by the sheer weight of the material in bin 12 pressing such large chunks downwardly against the vertically disposed bars 42 of grid 40. The reduced-sized chunks will then be fed more efficiently by auger 18 toward center mounted paddle 26. Simultaneously, very fine or small particles formed during the cutting of large chunks by bars 42 will sift through openings 38 in side screens 36 and flow downwardly toward hopper opening 28, for example, via the path shown by arrows A in FIG. 3.

All the while, the constant rotating action of auger 18 and central paddle 26 will churn larger pieces of fertilizer material against apertured auger plate 30, creating smaller and smaller pieces and fines which eventually are forced or fall through the small holes 32 in the trough, and then funnels downwardly through hopper opening 28 to the elevator for transfer to a mixer or other container or device.

Thus it may be seen that each portion of the new conditioning structure is useful in its own right as a means for improving flow-through during hopper transfer of fertilizer ingredients, or any other substances which tend to clump. However, in the particular combination described, the whole is greater than the proverbial totality of the parts as the efficiency of processing provided is vastly improved especially over known agricultural hoppers, as well as over any one portion of the conditioning structure in a hopper alone.

Figure 9:
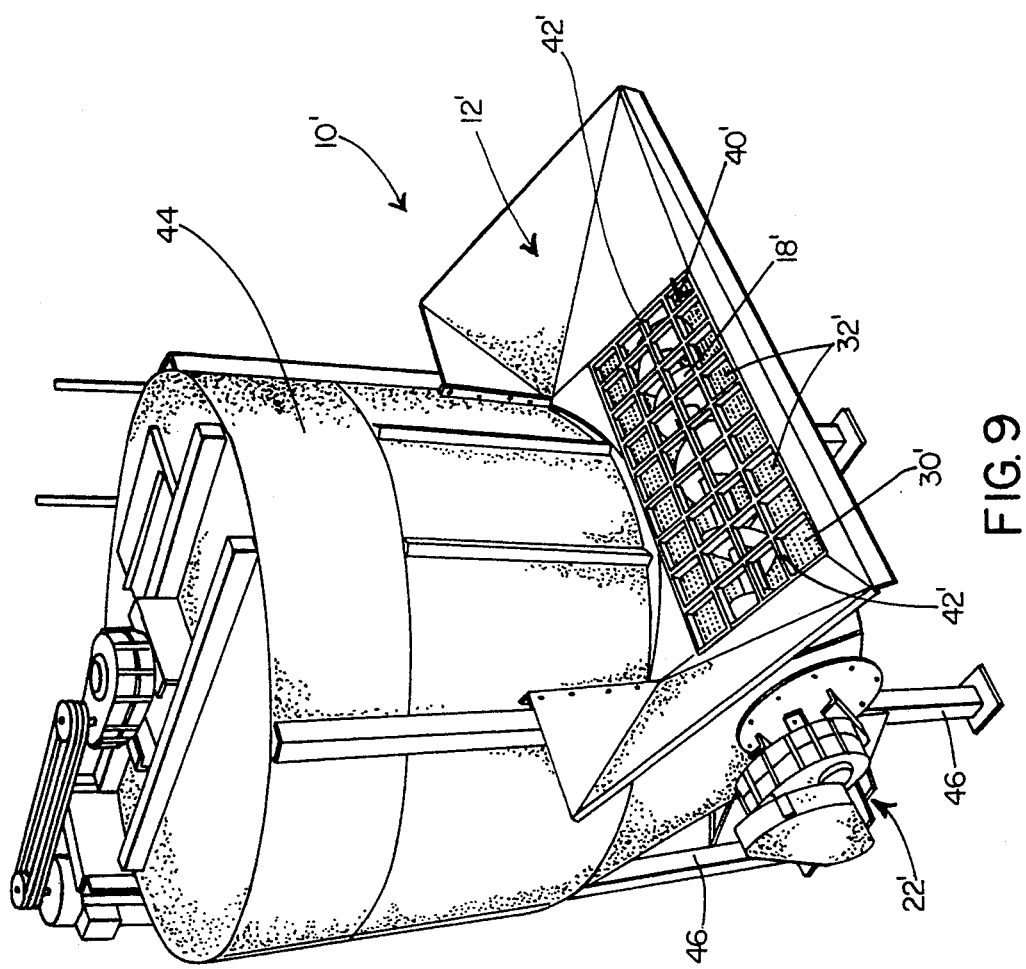
FIG. 9 is a top front perspective view of the blender and hopper with conditioner of FIG. 8.
Figure 8:
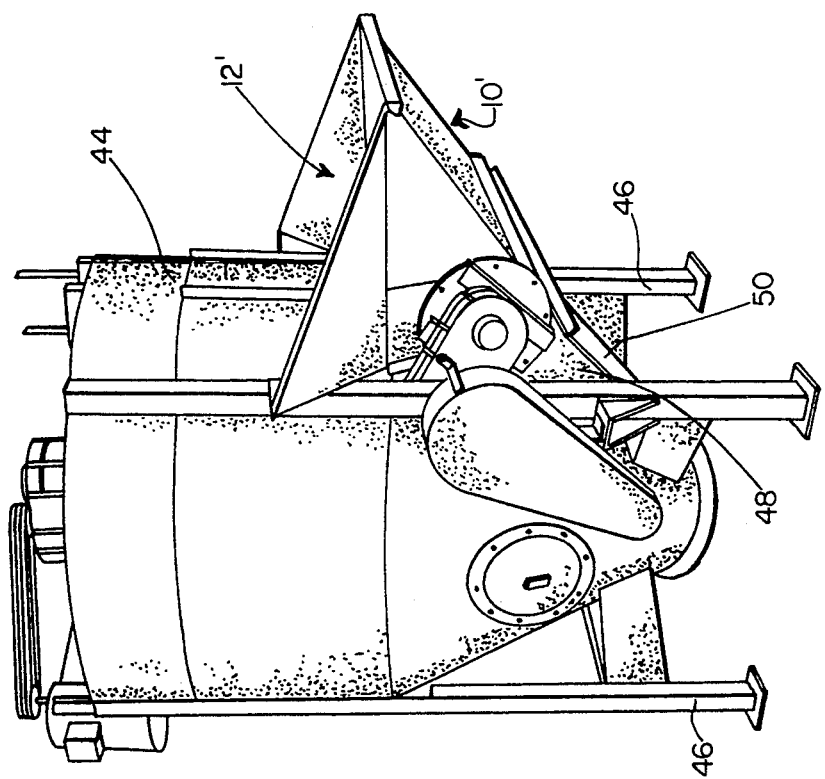
FIG. 8 is a front and side perspective view of a vertical blender having a second embodiment of a hopper with a conditioner constructed in accordance with the invention.

FIGS. 8 and 9 illustrate a second embodiment of the invention, generally designated and referred to as hopper 10'. However, rather than being free-standing as is hopper 10, the first embodiment, the second embodiment, hopper 10', consists generally of a bin 12' connected to the side of the vertical blender 44, itself supported on legs 46.

In this manner material can be conditioned in hopper 10' in a similar manner as in the first embodiment, but prior to being directly transferred into the attached vertical blend tower 44. Otherwise, in the second embodiment the conditioning structure is substantially the same as that shown and discussed with reference to FIGS. 1–7. However, it is shown lacking side screens 36, which could be added if desired. Within the bottom of bin 12' an auger 18' is mounted longitudinally in the same manner as previously described, and therebeneath is the longitudinally aligned auger plate or trough 30' having apertures 32'. Mounted horizontally above auger 18' is a heavy metal grid 40' desirably constructed substantially the same as that of the previous embodiment. Also, either grid 40 or 40' may be hinged, if preferred, for easily shifting out of the way for access therebeneath, for example to clear the corresponding auger.

Furthermore, rather than having an unobstructed opening 28 beneath the auger, in this second embodiment the hopper bottom opening (not seen) connects to an enclosed passageway 48 which connects the bottom of bin 12 with the lower portion of blender 44. The outward facing wall of passageway 48 is preferably formed at least in part of a door 50 provided for access beneath trough 30' for clean-out purposes.

Auger 18' is similarly operated, for example by a motor 22', in like manner to the first embodiment. Also, as in the first embodiment, motor 22' is preferably a 7½ horsepower three-phase, 50 or 60 Hz motor with a model three gear box and is capable of providing low (e.g. 16) RPM's. Of course, a variety of known motor and drive arrangements can be used adequately to operate the respective augers.

Thus, in this second embodiment of the invention, the structure within hopper 10' provides the conditioning functions of allowing fines to filter down through the apertures 32' in auger plate 30' in order to enhance flow-through of material placed into bin 12'. This rapid removal of fines permits greatly facilitated volume of material passing from bin 12' into blend tower 44 in a given time period. Also, grid 40' serves the same functions as previously described, being not only a safety grid, preventing accidental catching or slipping into the auger 18', but also providing the added function that if large blocks of materials become formed in bin 12', for example in extremely humid conditions, the sheer weight of further material placed thereon will force the blocks against the grid and cause the blocks to break into smaller chunks for improved agitation or churning by auger 18'.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A hopper which conditions soft agricultural material placed therein prior to transfer of the material to a mixer, the hopper comprising, a bin into which material to be conditioned is placed, the bin having downwardly sloping walls having lower edges and upper edges and extending continuously between the corresponding lower and upper edges, the walls terminating at the lower edges thereof slightly apart so as to define an opening for material exit at the bottom of the bin, means for supporting the bin spacedly above a support surface therefor, means for churning material to be conditioned which is placed in the bin, the means for churning being movably mounted within the bin spacedly above the opening for material exit, and conditioning means mounted within the bin spacedly in relation to the churning means so as to cause conditioning of at least some of the material placed into the bin before the at least some of the material placed into the bin can contact the churning means, and permitting material placed into the bin which is of sufficiently small size to bypass the churning means, whereby the material placed into the hopper is conditioned prior to transfer to a mixer where it is mixed with other materials to enhance homogeneity of the resulting mixture.

2. The hopper of claim 1, wherein the means for churning is an auger having a blade fixed on a shaft which is rotatably mounted horizontally in the bin spacedly above the opening formed by the downwardly sloping walls of the bin.

3. The hopper of claim 2, wherein the means for conditioning material placed into the hopper includes a rigid trough penetrated by a plurality of apertures and mounted within the bin longitudinally adjacent to and beneath the auger so that as the auger rotates and churns material within the bin large chunks of material are forced against the trough, to thereby grind and crush the chunks of material into particles sufficiently small to pass through the apertures in the trough, after which the small particles of material exit through the hopper opening.

4. The hopper of claim 2, wherein the auger is provided with a rigid paddle which is fixed centrally upon the shaft, and the auger blade is fixed to the shaft from the position of the paddle, outwardly toward opposed ends of the shaft, the auger blade thus being of two halves, each half positioned on the shaft so as to urge material contacted thereby centrally in the trough, toward the paddle, the material contacted by the paddle being crushed thereby against the trough and broken into small particles which pass through the apertures in the trough and downwardly through the opening in the bottom of the hopper.

5. The hopper of claim 1, wherein the conditioning means includes a plurality of screens each having an upper edge and a lower edge and being configured so that the periphery of each screen defines an area substantially corresponding in shape to a corresponding wall of the bin and to which each of the screens is mounted in inwardly spaced, angled relationship thereto, the screens being mounted by being connected at the upper edges thereof to upper edges of the bin walls, the lower edges of the screens being disposed spacedly upward from the bottom ends of the side walls and spacedly outwardly in relation to the churning means, to thereby permit fine particles of material placed into the hopper to filter through the screens and to fall onto the inner surface of the sloped walls therebeneath prior to exiting via gravity, outwardly through the opening in the bottom of the hopper, bypassing the churning means and thus reducing the volume of material which must be churned thereby.

6. The hopper of claim 1, wherein the conditioning means includes a grid having large openings therein positioned substantially horizontally in the bin above the churning means.

7. The hopper of claim 6, wherein the grid is formed of flat rigid material strips fixed together with narrow edges of the flat rigid strips in abutting relationship, so that when the grid is substantially horizontally positioned in the bin above the churning means wide edges of the flat rigid strips are disposed vertically, to thereby cause large blocks of agglomerated material placed into the bin for conditioning to be forced against the narrow edges of the flat material strips and under the weight of further material placed into the bin to be cut by the grid into chunks for improved efficiency of churning by the churning means.

8. The hopper of claim 1, wherein the hopper is supported on a plurality of legs, so as to be free-standing.

9. The hopper of claim 1, wherein the hopper is connected to a vertical blender for direct transfer thereto of material which has been conditioned within the hopper.

10. For use in combination with an agricultural hopper, a fertilizer conditioner comprising, churning means and a plurality of screens each having an upper edge and a lower edge and being configured so that the periphery of each screen defines an area substantially corresponding in shape to a corresponding wall of the hopper and to which each of the screens is mounted in inwardly spaced, angled relationship thereto, the screens being mounted by being connected at the upper edges thereof to upper edges of the hopper walls, the lower edges of the screens being disposed spacedly upward from the bottom ends of the side walls and spacedly outwardly in relation to the churning means, to thereby permit fine particles of material placed into the hopper to filter through the screens and to fall onto the inner surface of the sloped walls therebeneath prior to exiting via gravity, outwardly through the opening in the bottom of the hopper, bypassing the churning means in the hopper and thus reducing the volume of material which must be churned thereby.

* * * * *